Oct. 8, 1940.  E. R. SCHOFIELD  2,216,925
REVERSING VALVE
Filed Sept. 18, 1939  2 Sheets-Sheet 1

INVENTOR.
BY *Edwin R. Schofield.*
*Walter C. Row.*
ATTORNEY.

Oct. 8, 1940.  E. R. SCHOFIELD  2,216,925
REVERSING VALVE
Filed Sept. 18, 1939  2 Sheets-Sheet 2

INVENTOR.
Edwin R. Schofield.
BY Walter C. Row
ATTORNEY.

Patented Oct. 8, 1940

2,216,925

UNITED STATES PATENT OFFICE 2,216,925

REVERSING VALVE

Edwin R. Schofield, Philadelphia, Pa.

Application September 18, 1939, Serial No. 295,375

4 Claims. (Cl. 121—46.5)

My invention relates to improvements in valve apparatus, and the novel features thereof are directed more particularly to improvements in reversing valves of the type shown and described in U. S. Letters Patent 2,134,208 which was issued to me on October 25, 1938.

The principal objects of this invention are directed to the provision of a valve of the type above referred to which, by reason of its novel construction, operates with a definite sequence rather than in a haphazard manner so as to provide a shut-off point and thereby to make it possible to operate or to control the operation of hydraulically operated apparatus, such as a sluice gate or the like, to the extent that the gate may be moved not only from open to closed position and vice versa but also to various intermediate positions as well.

Numerous and various novel objects and advantages of the invention will be observed from the following description of the preferred form of invention with reference to the accompanying drawings, wherein.

Figure 2:
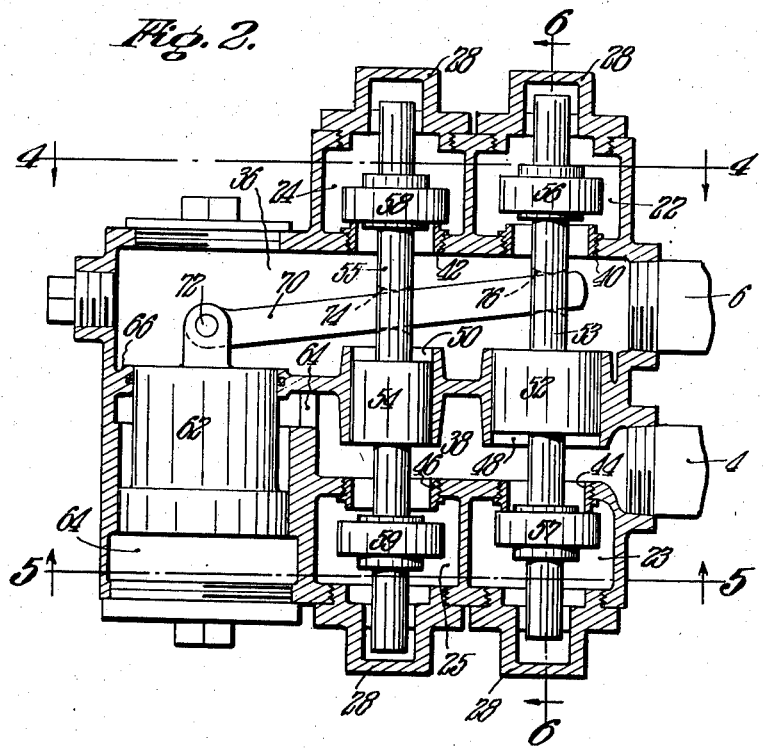
Fig. 2 is a longitudinal sectional elevational view through the valve shown in Fig. 1.
Figure 3:
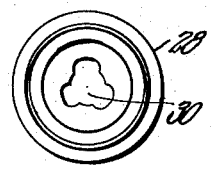
Fig. 3 is a plan view of one of the caps of the valve showing the valve rod guides.

Referring now to the drawings more in detail, the novel valve apparatus of the invention will be fully described.

Figure 1:
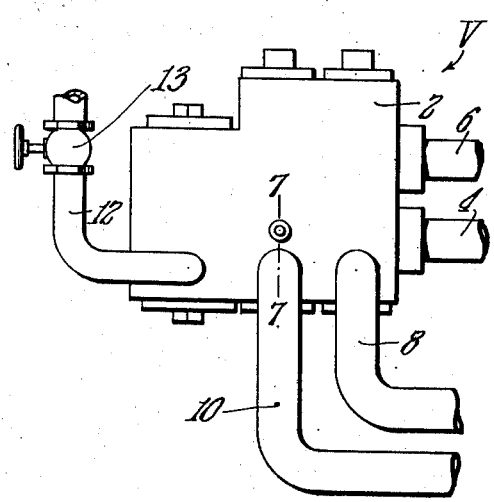
Fig. 1 is a small scale side elevational view of a reversing valve embodying the novel features of the invention.
Figure 4:
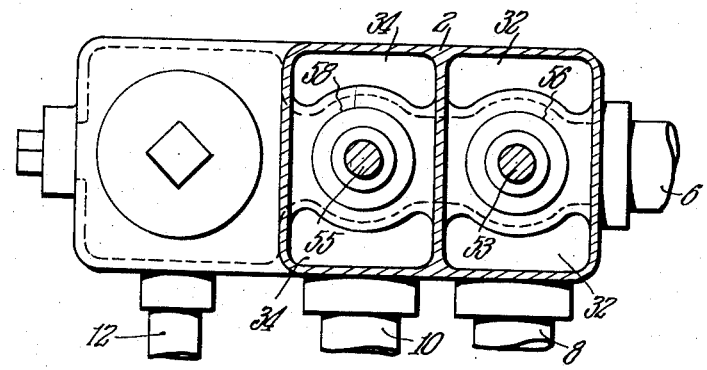
Fig. 4 is a sectional plan view on the line 4—4 of Fig. 2.
Figure 5:
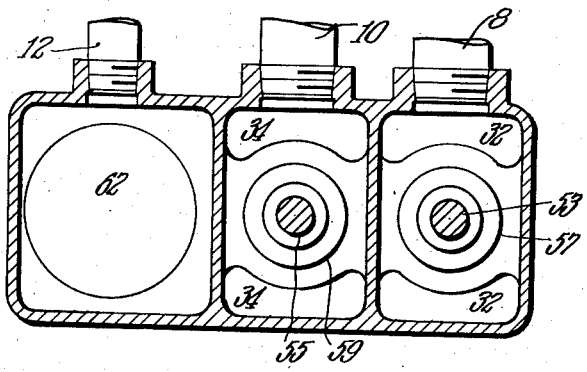
Fig. 5 is a similar view on the line 5—5 of Fig. 2.
Figure 6:
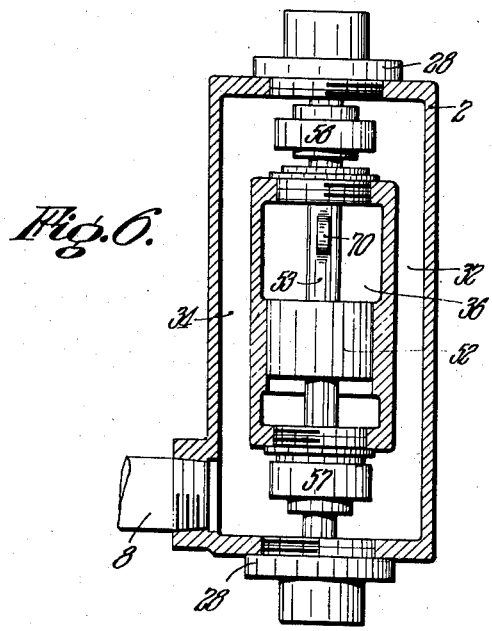
Fig. 6 is a sectional elevational view on the line 6—6 of Fig. 2.

The valve of the invention represented by V in Fig. 1 includes a housing or body 2 within which the entire valve mechanism is entirely enclosed, thereby to obviate moving parts exteriorly thereof, such as stuffing boxes and their inherent objections and disadvantages.

A supply pipe is represented by 4 and a discharge pipe is represented by 6. Water or other fluid enters the valve through pipe 4, and the mechanism within the valve causes the same to be directed out through one or the other of pipes 8 or 10. These pipes 8 and 10 may be connected to the hydraulic cylinder of a sluice gate or other apparatus and the water returns through the other one of the pipes 8 or 10 and out a discharge 6. A pipe 12 may be connected to a valve 13 or the like which may be utilized to control or to operate the valve apparatus.

As stated, the casing or body is provided within which the valve mechanism is entirely enclosed not only to provide a compact unitary structure but also to provide one wherein the moving parts are protected.

In the upper side of the body there is a pair of separate chambers 22 and 24 and in the lower portion there is a pair of chambers 23 and 25. These chambers are closed by caps such as 28 associated with the housing and the said caps may be provided with guideways of suitable form such as is indicated at 30 for valve or piston rods to be described. Vertical passageways 32 and 34 connect the upper chambers 22 and 24 with the lower chambers 23 and 25.

A more or less horizontal chamber 36 is disposed below and separated from the chambers 22 and 24. This may be called the discharge chamber and the discharge pipe 6 is connected thereto. A supply chamber 38 to which the supply pipe 4 is connected is disposed below and separated from the discharge chamber.

The pipes 8 and 10 are connected respectively to the lower chambers 23 and 25. These pipes may be connected to any hydraulically-operated device. For instance, they may be connected to opposite ends of a cylinder in which a piston is reciprocable such as the cylinder of a sluice gate or the like. As fluid flows out one of the pipes 8 or 10 to one end of such a cylinder to bring about relative reciprocation of the cylinder and piston, water from the opposite end of the cylinder is returned through the other pipe.

Hollow valve seats 40, 42, 44 and 46 are provided so that either one of the chambers 22 and 24 may be in communication with the discharge chamber 36 and either one of chambers 23 or 25 may be in communication with the inlet chamber 38. Piston bores 48 and 50 connect the chambers 36 and 38 the former 48 of which is preferably larger or greater in area than the latter, as shown.

The piston 52 is reciprocable in bore 48 and a rod 53 at upper and lower sides thereof carries valves 56 and 57 which valves operate with the valve seats 40 and 44 to control communication between the chambers 22 and 23 and the chambers 36 and 38 adjacent thereto. A piston 54 reciprocable in bore 50 has a rod 55 at upper and lower sides which carries valves 58 and 59 that similarly operate with seats 42 and 46.

As the pistons 52 and 54 move from one position to another one of the valves on the rod thereof is moved off from or onto its seat while the other of said valves moves reversely relative to its seat.

A differential piston 62 is reciprocable in a bore provided therefor, and caps above and below said bore are provided, as shown. The upper side of the bore or of the piston 62 is disposed within or is in communication with chamber 36 and the lower side of the said bore or piston is disposed above a chamber 64 provided in the casing to which relief pipe 12 is connected. A passageway 64 connects supply chamber 38 with the differential piston bore between a wall portion 66 around the upper side of the piston 62 and an enlarged lower part of said piston, all as shown.

A link 70 is pivotally connected at 72 to the piston 62 and it is operatively connected to rods 53 and 55 by extending through openings 74 and 76 of the said rods. This link 70 and the upper end of piston 62 are enclosed entirely within the housing and the ends of rods 53 and 55 are enclosed by caps to obviate stuffing boxes and the like and their inherent disadvantages and objections.

Figure 7:
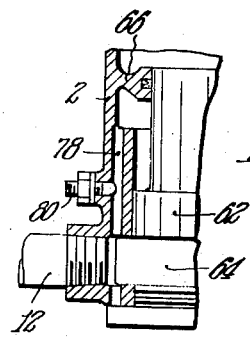
Fig. 7 is a partial sectional elevational view on the line 7—7 of Fig. 1.

A weeper passageway 78 extends alongside of the bore for piston 62 as shown in Fig. 7 and a valve or control member 80 in threaded engagement with the housing is adjustable to vary the size of or to control the extent of communication between chambers 38 and 64.

The operation of the valve will now be described. It will be understood that pipe 4 is connected to a suitable water supply and that pipes 8 and 10 are connected to opposite ends of a hydraulic cylinder in which is a piston. The pressure relief valve 13 is provided in relief pipe which is adapted, when opened, to relieve pressure in chamber 64. When the said valve is closed pressure may build up in chamber 64 to act on and elevate piston 62.

With the position of the parts, shown in the drawings, water, through pipe 4, enters chamber 38, flows past valve 59 into chamber 25 and out through pipe 10. This brings about relative movements of the piston and cylinder to which pipes 8 and 10 are connected. Water returns from the other end of the cylinder through pipe 8 into chamber 23. From chamber 23 water flows upwardly through passageways 32, past valve 56 into discharge chamber 36 and out discharge 6. This continues until the piston and cylinder have been moved to the desired relative position.

If the relief valve in line 12 is closed, pressure will be built up in chamber 64 beneath piston 62 and when pressure in chamber 64 exceeds that on top of piston 62 the said piston begins to move upwardly. Piston 54 will move upwardly before piston 52 moves downwardly because piston 52 due to its larger area is held by greater pressure. At the moment valve 59 seats, and since valve 59 is already seated and held in seated position by the hydraulic pressure, there is no communication between chambers 38 and 36 or the discharge is closed. This is a shut-off condition and the operator may stop the operation of the valve by stopping movement of piston 62 by manipulation of the relief valve in pipe 12 which makes it possible to maintain the relative position of the piston and cylinder connected to pipes 8 and 10 as may be desired.

Assume that the piston 62 travels upwardly to the limit of its stroke then piston 52 is moved downwardly so that with valve 59 on its seat the action of the valve is reversed or its parts are in a relation reversed to that shown.

In the reversed position of the parts water from supply pipe 4 flows past open valve 57, out pipe 8 to the cylinder at one side of the piston thereon while water from the cylinder at the other side of the piston enters chamber 25 through pipe 10 flows upwardly through passageways 34 into chamber 24, flows past valve 58 into discharge chamber 36 and out pipe 6.

The relief valve 13 or some suitable device in pipe 12 will control the action of the differential piston 62 so that water flows in or out either one of the pipes 8 or 10 thereby to bring about such movements of the piston and cylinder connected to said pipes as may be desired. As has been pointed out the pistons 52 and 54 are of different size or area so that there is a shut-off condition or position of the parts where the discharge is closed.

It will be observed that the valve rods are guided in such a way that stuffing boxes are eliminated which the entire mechanism is entirely enclosed thereby not only providing a compact unitary structure but one in which the relatively movable parts are protected thereby to obtain the desired efficiency in operation.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. A unitary reversing valve apparatus comprising in combination, a casing having separate inlet and discharge chambers, a pair of upper separate chambers above and a pair of lower separate chambers below said inlet and discharge chambers with each of the upper chambers connected to a lower chamber by separate passageways, and a differential piston bore, hollow valve seats between said separate upper and lower chambers and said discharge and inlet passageways, piston bores connecting said inlet and discharge chambers one of which is larger in diameter than the other, pistons reciprocable in said bores and rods extending through said valve seats into said upper and lower chambers, valves on said rods in said chambers engageable with said seats, caps closing said upper and lower chambers in which said rods are reciprocable, a differential piston in the differential bore, and a link pivotally connected to the upper side of said differential piston disposed within said discharge chamber operably connected to said rods.

2. A unitary reversing valve apparatus comprising in combination, a casing formed to have a pair of separate upper chambers and a pair of separate lower chambers with a passageway connecting one upper chamber to a corresponding lower chamber and a passageway connecting the other upper chamber to the other lower chamber, separate inlet and discharge chamber therebetween, a differential piston bore having its upper end in communication with the discharge chamber, a passageway intermediate the ends of said bore opening into the inlet chamber, and piston bores one of which is relatively larger than the other connecting the inlet and discharge chambers, a differential piston in said differential bore, hollow valve seats connecting said upper and lower chambers with the discharge and inlet chambers respectively, pistons reciprocable in said piston bores, rods extending upwardly and downwardly from said last named pistons through said seats into the upper and lower chambers, valves on said rods within said chambers engageable with said seats, and a link wholly within the discharge chamber pivotally connected to said differential piston and operable connections between said link and piston rods.

3. A unitary reversing valve apparatus comprising in combination, a casing formed to have a pair of separate upper chambers and a pair of separate lower chambers with a passageway connecting one upper chamber to a corresponding lower chamber and a passageway connecting the other upper chamber to the other lower chamber, separate inlet and discharge chamber therebetween, a differential piston bore having its upper end in communication with the discharge chamber, a passageway intermediate the ends of said bore opening into the inlet chamber, and piston bores one of which is relatively larger than the other connecting the inlet and discharge chambers, a differential piston in said differential bore, hollow valve seats connecting said upper and lower chambers with the discharge and inlet chambers respectively, pistons reciprocable in said piston bores, rods extending upwardly and downwardly from said last named pistons through said seats into the upper and lower chambers, valves on said rods within said chambers engageable with said seats, and a link wholly within the discharge chamber pivotally connected to said differential piston and operable connections between said link and piston rods, and caps at the upper and lower sides of said upper and lower chambers in which the ends of said piston rods are reciprocable.

4. A unitary reversing valve apparatus comprising in combination, a casing formed to have a pair of separate upper chambers and a pair of separate lower chambers with a passageway connecting one upper chamber to a corresponding lower chamber and a passageway connecting the other upper chamber to the other lower passageway, separate inlet and discharge chamber therebetween, a differential piston bore having its upper end in communication with the discharge chamber, a passageway intermediate the ends of said bore opening into the inlet chamber, and piston bores one of which is relatively larger than the other connecting the inlet and discharge chambers, a differential piston in said differential bore, hollow valve seats connecting said upper and lower chambers with the discharge and inlet chambers respectively, pistons reciprocable in said piston bores, rods extending upwardly and downwardly from said last named pistons through said seats into the upper and lower chambers, valves on said rods within said chambers engageable with said seats, and a link wholly within the discharge chamber pivotally connected at one end to said differential piston and extending through openings provided in said piston rods for operably connecting said link and rods and differential piston, and caps at the upper and lower sides of said upper and lower chambers in which the ends of said piston rods are reciprocably guided.

EDWIN R. SCHOFIELD.